United States Patent [19]

Diggins

[11] Patent Number: 4,498,339
[45] Date of Patent: Feb. 12, 1985

[54] METHOD FOR INSPECTING INTERIOR OF A PRESSURE VESSEL HAVING REPLACEABLE PLUG ASSEMBLY

[75] Inventor: Joseph P. Diggins, Coraopolis, Pa.

[73] Assignee: Foster Wheeler Energy Corporation, Livingston, N.J.

[21] Appl. No.: 548,384

[22] Filed: Nov. 3, 1983

Related U.S. Application Data

[62] Division of Ser. No. 398,487, Jul. 15, 1982.

[51] Int. Cl.³ .................... G01M 19/00; G01M 11/00
[52] U.S. Cl. .................... 73/432 R; 29/426.4; 220/3; 228/184; 228/191
[58] Field of Search .......... 73/432 V, 432 R; 116/201; 29/564.3, 564.7, 426.4, 407; 408/1; 409/133; 228/191, 184; 138/104; 220/3

[56] References Cited

U.S. PATENT DOCUMENTS

| | | | |
|---|---|---|---|
| 146,901 | 1/1874 | Harrison et al. | 408/1 X |
| 1,902,862 | 3/1933 | Kerr et al. | 220/3 X |
| 1,958,582 | 5/1934 | Kerr et al. | 220/3 |
| 2,060,888 | 11/1936 | Newman | 29/426.4 X |
| 2,685,382 | 8/1954 | Cornelius | 220/3 |
| 2,818,697 | 1/1958 | Block | 408/1 |
| 2,835,404 | 5/1958 | Andrus | 220/3 |
| 3,079,033 | 2/1963 | Wooton | 220/3 |
| 3,180,018 | 4/1965 | Hougen | 228/191 |
| 3,263,721 | 8/1966 | Ewaskowitz | 408/1 X |
| 4,095,916 | 6/1978 | Hammond | 408/1 |

FOREIGN PATENT DOCUMENTS

| | | | |
|---|---|---|---|
| 2833716 | 1/1980 | Fed. Rep. of Germany | 73/432 V |
| 517371 | 2/1955 | Italy | 220/3 |

*Primary Examiner*—Gerald Goldberg
*Assistant Examiner*—Tom Noland
*Attorney, Agent, or Firm*—Marvin A. Naigur; John E. Wilson; Martin Smolowitz

[57] ABSTRACT

A replaceable inspection plug assembly and method for its use with pressure vessels. The plug assembly comprises a collar seal welded onto a pressure vessel outer wall, and a threaded plug removably threaded into the collar and the vessel wall. The plug has a shoulder portion which is seal welded to the collar. For removal of the plug, the seal weld is first machined away using a special cup-shaped rotary machining tool. The plug is then cooled and contracted relative to the collar, and is then unscrewed and removed. Following inspection of the vessel interior, the plug is replaced in the threaded hole and the plug shoulder portion is rewelded to the collar to provide a structurally-rigid and leak-tight joint without need for subsequent stress relieving the welded joint.

6 Claims, 4 Drawing Figures

METHOD FOR INSPECTING INTERIOR OF A PRESSURE VESSEL HAVING REPLACEABLE PLUG ASSEMBLY

This is a division of application Ser. No. 398,487 filed July 15, 1982.

BACKGROUND OF THE INVENTION

This invention pertains to a replaceable pressure-tight inspection plug assembly adapted for use in inspecting the interior of a pressure vessel, and to a method for conveniently removing and replacing the plug pressure-tightly in the vessel wall using a mating rotatable machining tool.

During the normal course of operation of pressure vessels, such as those operating at 500–5000 psig. pressure, it is often desirable or necessary to inspect internal components of the vessel, such as during the warranty period or following extended periods of operation. Various inspection means or openings have been provided for making such internal inspections of pressurized equipment, such as bolted flanges, weld caps, and the like. However, such inspection openings using bolted flanges is usually not suitable because of potential gasket leakage problems. Also, inspection openings involving welded joints are usually difficult and time-consuming to remove and replace, and may require a stress relieving step following rewelding. For these reasons, there has been a need for a simpler inspection plug which can be removed with a minimum of time and labor expense. The present inspection plug assembly not only permits good visibility of the vessel internal areas and thus prevents or limits any internal failure by providing inspection capability, but also is pressure-tight and convenient to remove and replace.

SUMMARY OF THE INVENTION

The present invention provides a replaceable inspection plug assembly adapted for use in pressure vessels, and a method for its convenient removal and replacement using a mating rotatable machining tool. The replaceable plug assembly comprises a reinforcing collar which is seal welded to a vessel outer wall, and a plug having a threaded shank portion and a cylindrical shoulder portion threaded into the collar and vessel wall, with the threads designed such that they are suitable for providing high loading and structural strength. The plug cylindrical shoulder portion is provided so as to accept a small seal weld deposit between the shoulder and the collar, such that the plug can be removed by removing the seal weld and reinstalled by rewelding without the necessity of any stress relieving of the vessel wall. The plug also contains an internal cavity which permits the circulation of a cooling fluid through the plug, thus causing thermal contraction of the plug so as to facilitate its removal from the vessel when at elevated temperature.

When conveniently removing the plug for interior inspection of the vessel, the seal weld between the plug shoulder and collar is first removed, such as by cutting or grinding, after which the plug is unscrewed and removed. The seal weld is preferably removed by using a mating cup-shaped rotatable machining tool provided with at least one cutting tool surface and placed concentrically over the plug. Using this machining tool, the seal weld can be quickly and conveniently machined away using the hand-held rotary machining tool driven by a suitable detachable motor driving means so as to permit easy removal of the plug.

The replaceable inspection plug assembly reduces the manufacturing cost for pressure vessels by completely eliminating the need for stress relieving the vessel wall following plug replacement. It also increases the capability of inspecting internal components of such vessels during the construction and pre-operation period, which saves substantial field labor costs.

DESCRIPTION OF THE PREFERRED EMBODIMENT

Figure 1:
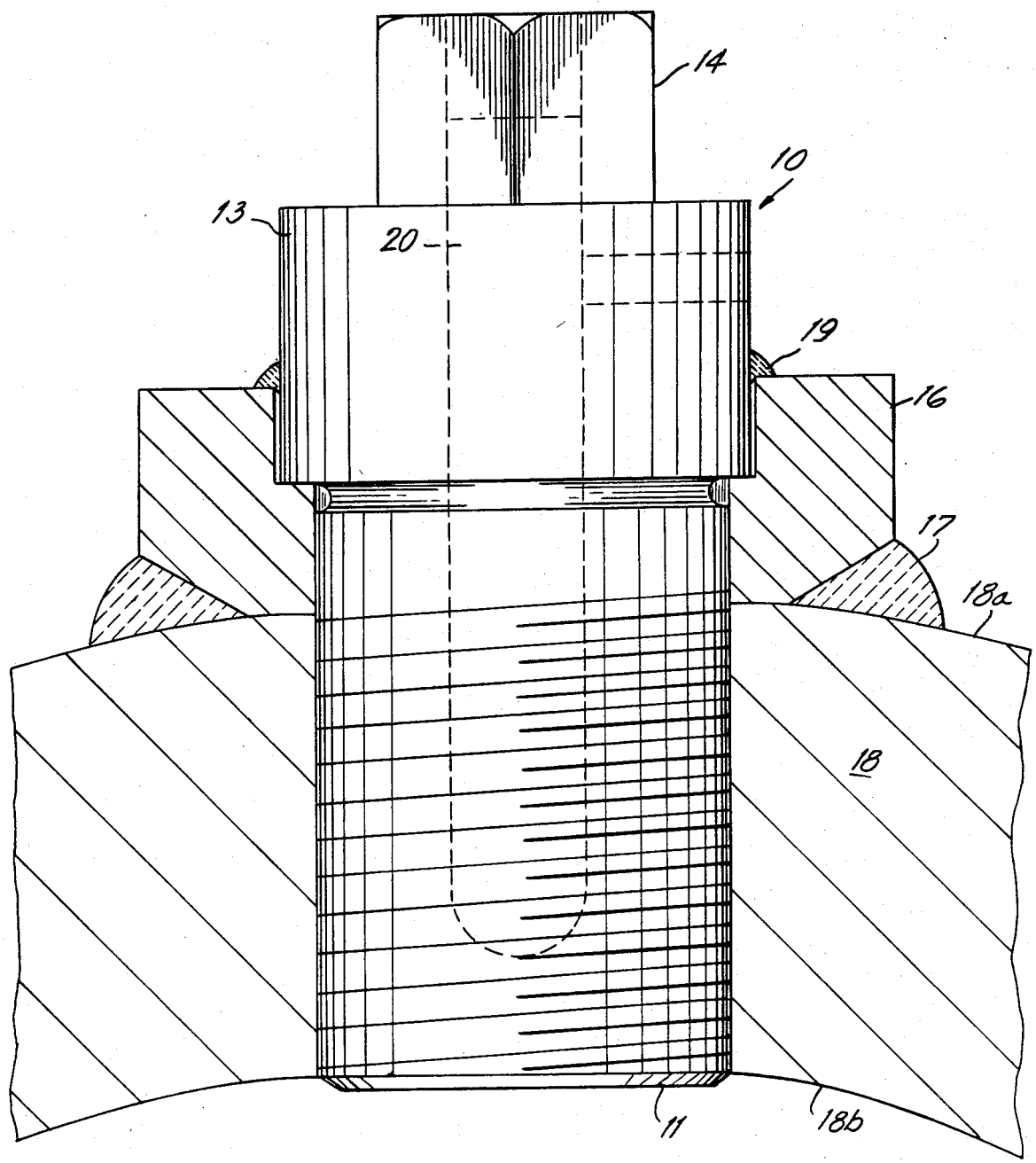
FIG. 1 is a vertical cross-sectional view of the inspection plug assembly installed in a pressure vessel wall.

As shown in FIG. 1, the replaceable inspection plug assembly 10 is threaded into reinforcing collar 16, which is attached by a seal weld bead 17 to the outer surface 18a of pressure vessel wall 18. Plug 10 includes a threaded shank portion 11 extending to near the inner surface 18b of wall 18, and designed such that the threads 12 are suitable for withstanding high internal pressure loading and providing structural strength to the joint, such as American Standard 60 degree V-threads, metric, or acme type thread which is preferred because of its high load-carrying capability. A cylindrical shoulder portion 13 is provided to accept a small seal weld bead 19 located between the plug and the collar 16. The plug 10 has an outer extension portion 14 having a shape such as square or hexagonal suitable for receiving a mating wrench means used for unscrewing and replacing the plug in the threaded hold. By removing and replacing seal weld bead 19, which can be small and need withstand only minimal pressure loading, the plug can be removed and reinstalled without the necessity of stress relieving the vessel wall 18. The plug and vessel wall are usually made of alloy steel, such as containing 1.25% chromium - 0.5 molybdenum or 2.25% chromium - 1% molybdenum.

Figure 2:
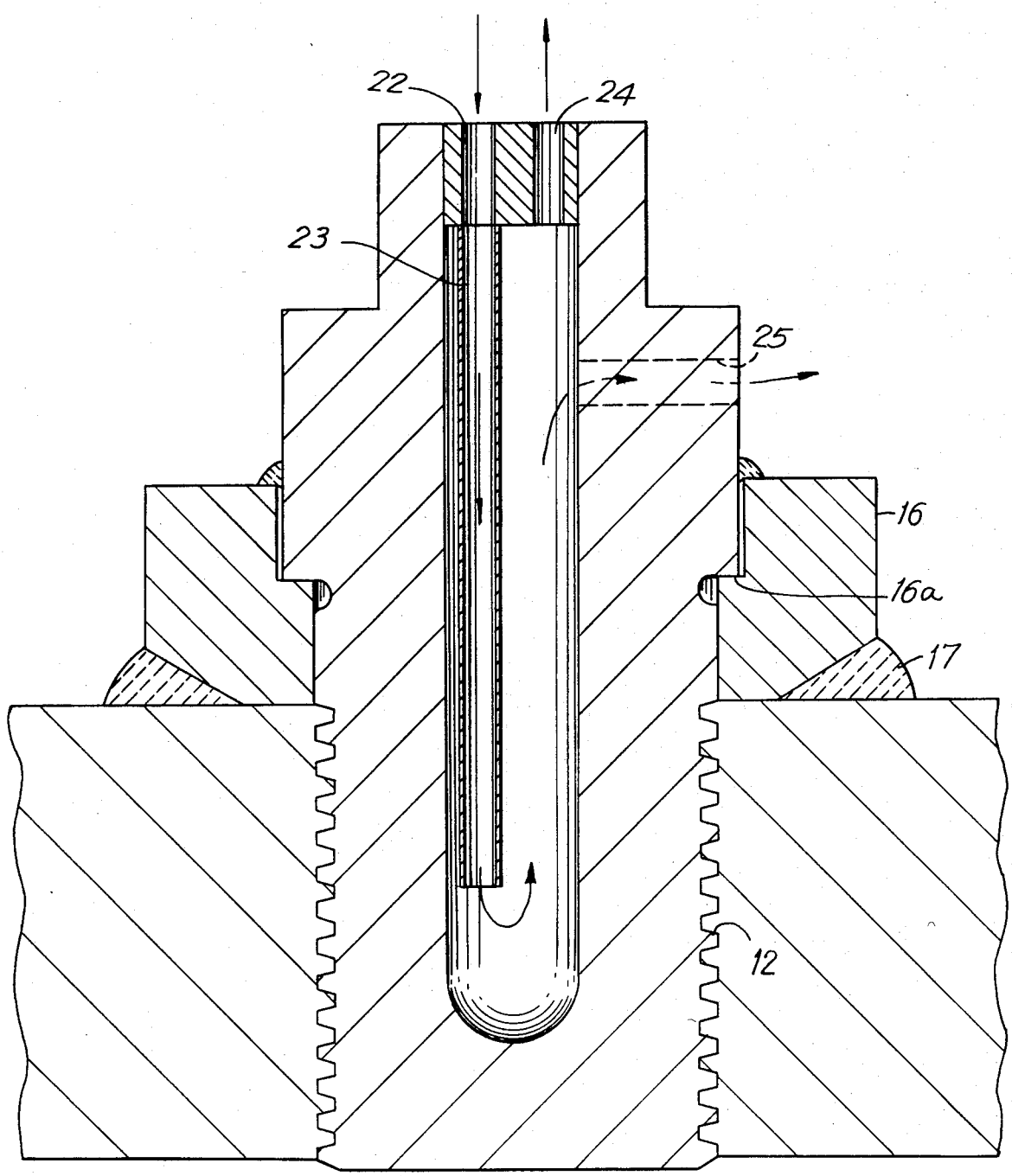
FIG. 2 is a vertical cross-sectional view of the plug assembly showing the plug internal cavity.

As shown by FIG. 2, the plug 10 also preferably contains an internal cavity 20 which permits the circulation of a cooling fluid such as air or water in through opening 22 and out through opening 24, thereby causing cooling and thermal contraction of the plug when hot relative to vessel wall 18, and thus facilitating unscrewing the plug for removal. If desired, a tube 23 can be provided extending into cavity 20 to assure that the cooling fluid reaches the lower end of cavity 20. Also, if desired, cooling fluid can be discharged radially outwardly through alternative opening 25. Also, if desired, a thread sealant material such as Hi-Temp. C-102 anti-seize lubricant supplied by Fel-Pro Inc., Skokie, Ill. 60076 and suitable for temperatures up to about 2400 degrees F. can be used on the threads between the plug threaded portion 11 and the threaded vessel collar 16 to prevent galling and facilitate removal of the plug. Shoulder portion 13 of the plug preferably has diameter larger than threaded shank portion 11, and is preferably seated onto an inner shoulder 16a of collar 16.

Figure 3:
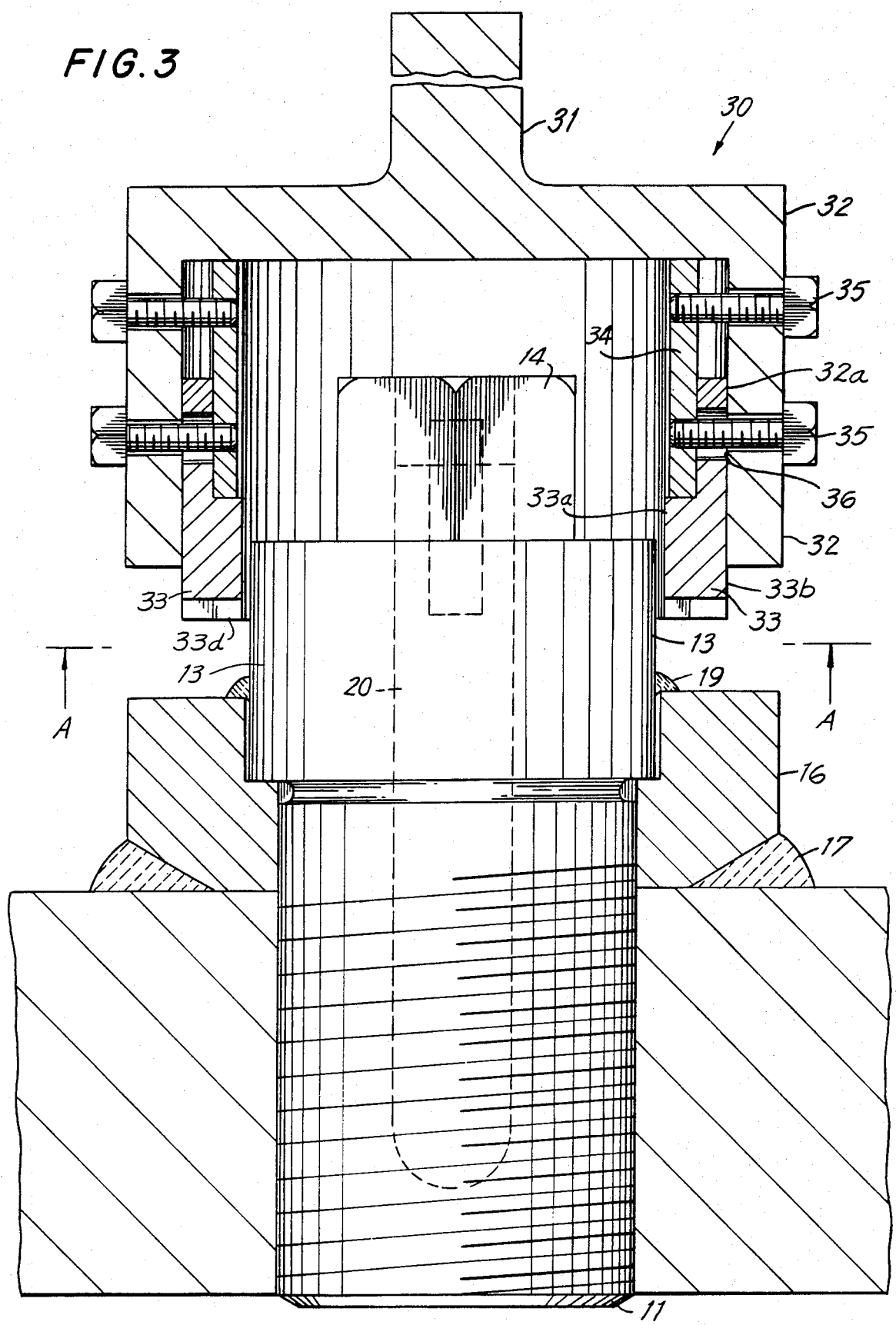
FIG. 3 shows the rotatable machining tool positioned over the inspection plug for use in removing the seal weld around the plug.

Whenever it is desired to remove plug 10 for inspecting the interior of vessel 18, seal weld bead 19 is first removed preferably by a cutting or machining step. As shown in FIG. 3, a cup-shaped rotatable machining tool 30 is provided having multiple cutting tool bits 33. Machining tool 30 is positioned over plug 10 in concentric alignment with the plug and is guided by plug cylindrical shoulder 13, then rotated using a detachable driving motor (not shown) connected to concentric drive shank 31. In this way, the seal weld 19 can be quickly machined away by cutting tool bits 33 to permit unscrewing and removing the plug 10 from the vessel wall 18. After removing the machining tool 30, a source or cooling fluid such as a water hose is connected to opening 22 on the plug, and the fluid passed through cavity 20 to cool and contract the plug relative to the vessel wall 18. The threaded plug 10 is then unscrewed from the threaded hole in the vessel wall and removed to permit inspecting the internal portions of the vessel. The outside diameter of plug 10 is made at least about 0.5 times the thickness of the vessel wall 18, and usually does not exceed about 1.5 times the thickness of the wall.

The replaceable plug assembly provides several advantages over conventional practice of providing a welded cap connection for inspections. The plug does not require a full penetration weld to adequately seal against high internal pressure of the vessel. This permits the seal weld to be sufficiently small size so that stress relieving the adjacent vessel wall is unnecessary. The plug can be removed and reinstalled more easily and quickly than prior configurations, and thus permits considerable cost savings to be realized. Also, the plug provides greater visibility into the vessel interior than prior inspection arrangements.

More specifically regarding the machining tool assembly 30, it comprises a cylindrical cup-shaped tool holder 32 having a concentric drive shank extension portion 31 and a skirt portion having an inner cylindrical surface 32a. At least two cutting tool bits 33, and preferably 3–6 tool bits, are provided substantially equally-spaced around the inner circumference of tool holder 32, and are rigidly clamped against inner surface 32a. Because the machining tool 30 is centered and guided by the inner surfaces 33a of the cutting tool bits contacting the plug shoulder portion 13, at least two tool bits located substantially equally spaced circumferentially in the holder are usually used. However, if desired, only one cutting tool bit and an oppositely located guide element could be used to provide centering of the tool holder 30 on the plug portion 13, but a slower cutting rate would be achieved. The tool bits 33 must be rigidly attached to the tool holder 32 so as to maintain their alignment and cutting effectiveness, and are clamped to holder 32 by plate 34 and retained by one or more bolts 35.

Figure 4:
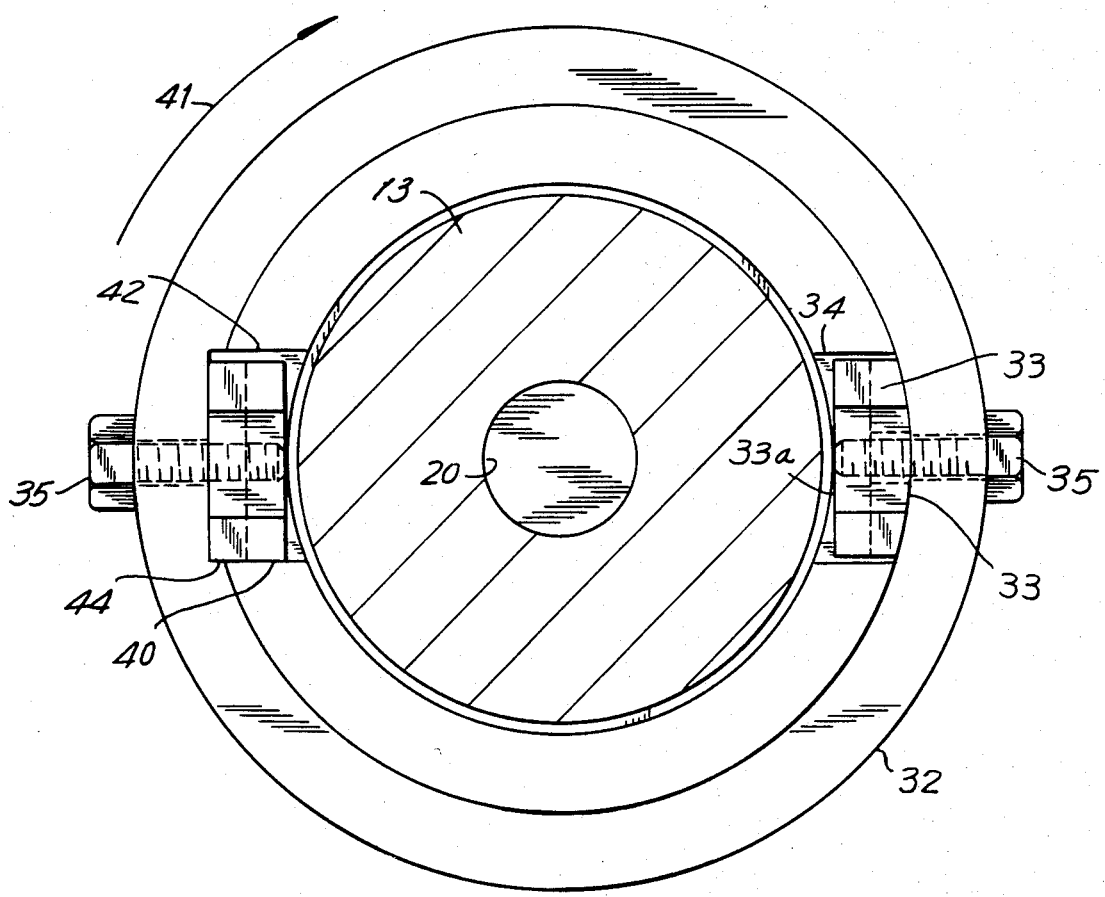
FIG. 4 is a cross-sectional view of the machining tool taken at section A—A of FIG. 3.

The tool bits 33 can have a flat inner surface 33a and the outer side 33b can be curved with a radius matching that of tool holder inner surface 32a, as is generally shown in FIG. 4. The tool curved outer surface 33b maintained in relationship with curved holder surface 32a serves to provide proper alignment and rigid clamping of the tool bit 33 to holder 32, so as to insure rotation of the tool bit together with the holder in the direction indicated by arrow 41. The inner surface of tool bits 33 form a diameter slightly larger than the outside diameter of plug cylindrical shoulder portion 13, typically by 0.010 to 0.035 inch, which serves as a centering guide surface for tool assembly 30.

Tool bits 33 are clamped in position by retaining plates 34 and bolts 35 which are threaded into the plates, and should not extend inwardly past tool surface 33a. Also, each tool bit 33 is shaped to have a shoulder portion 33c which fits against the lower end 34a of plate 34 and thereby limits upward movement of the tool bit 33. Clearance hole 36 provides for limited longitudinal movement for proper adjustment of tool bit 33. The lower end 33d of tool bits 33 are ground so as to have the proper cutting angles as is generally used for machining weldable metals. In addition, the tool bit is ground so as to provide a 90 degree angle corner cut adjacent shoulder portion 13 of plug 10 so as to completely remove seal weld 19.

Alternatively, the tool bits in tool holder 32 can have a rectangular cross-sectional shape such as for tool bit 40, and can be advantageously located in a longitudinal slot 42 cut into the inner surface 32a of the holder 32, as is also shown in FIG. 4. The slot 42 should be slightly wider than the tool bit 40, which will be located against shoulder 44 which serves to provide assured rotation of the tool bit by the holder 32 in the direction of arrow 41.

The cup-shaped tool holder 32 and plates 34 are typically made of steel, and tool bits 33 or 40 are typically made of a hardenable high carbon tool steel.

Although rotary machining tool assembly 30 has been shown in FIGS. 3 and 4 and is described as used in combination with removable plug 10 specifically for removing seal weld 19 prior to unscrewing plug 10, the tool assembly 30 can also be used advantageously for machining other structures having a central guidance surface with diameter slightly smaller than that of the inner surface of cutting tool bits 33 (or 40).

Although this invention has been described broadly and in terms of a preferred embodiment, it is understood that various modifications can be made and that some features can be used without others all within the spirit and scope of the invention, which is defined by the following claims.

I claim:

1. A method for visually inspecting the interior of a pressure vessel through a hole containing a replaceable plug, comprising:
   (a) removing a seal weld from around a cylindrical shoulder of a threaded plug and an adjacent threaded reinforcing collar in the pressure vessel by positioning a cup-shaped rotary machining tool having at least one cutting edge concentrically disposed over said plug, guiding said tool by the cylindrical shoulder surface of the plug and rotating the tool to cut away the weld;
   (b) unscrewing and removing said threaded plug from said threaded reinforcing collar in the vessel wall;
   (c) viewing the interior of said vessel and then replacing the threaded plug; and
   (d) remaking the seal weld between the threaded plug cylindrical shoulder and said adjacent reinforcing collar.

2. The method of claim 1, wherein said machining tool is hand held by an operator.

3. The method of claim 1, wherein a cooling fluid is passed through an internal cavity in said threaded plug to cool and contract the plug threads relative to the threaded reinforcing collar in the vessel wall before unscrewing the plug.

4. The method of claim 3, wherein said cooling fluid is water.

5. The method of claim 1, wherein a thread sealant material is applied to said threaded plug before replacing the plug in said reinforcing collar.

6. A method for visually inspecting the interior of a pressure vessel through a hole containing a replaceable threaded plug, comprising:
(a) positioning a cup-shaped rotary machining tool having multiple cutting edges concentrically over the threaded plug, guiding the tool by a cylindrical shoulder surface of the plug, rotating the tool and cutting away a seal weld from around the cylindrical shoulder portion of the plug and an adjacent reinforcing collar in the pressure vessel;
(b) passing a cooling fluid through an internal cavity in said threaded plug to cool and contract the plug threads relative to the threaded reinforcing collar in the vessel wall;
(c) unscrewing and removing said threaded plug from said threaded reinforcing collar in the vessel wall;
(d) viewing the interior of said vessel and then replacing the threaded plug; and
(e) remaking the seal weld between the threaded plug cylindrical shoulder portion and said adjacent reinforcing collar.

* * * * *